United States Patent
Calhoun

[15] 3,693,280
[45] Sept. 26, 1972

[54] COMBINED BOAT HOOK AND LURE RETRIEVER

[72] Inventor: Ray Calhoun, P.O. Box 1336, Taft, Calif. 93268

[22] Filed: Nov. 13, 1970

[21] Appl. No.: 89,169

[52] U.S. Cl. .................................................43/17.2
[51] Int. Cl. ..............................................A01k 97/00
[58] Field of Search ..............294/86, 15, 19; 43/17.2

[56] References Cited

UNITED STATES PATENTS 2,940,203   6/1960   Carter .......................43/17.2
3,531,887   10/1970  Bortle .......................43/17.2
2,950,558   8/1960   Karpes ......................43/17.2

Primary Examiner—Evon C. Blunk
Assistant Examiner—H. S. Lane
Attorney—Huebner & Worrel

[57] ABSTRACT

A fish lure retriever having a pole, a fish line following guide mounted on the pole, and hook snagging means mounted on the pole adjacent to the guide.

3 Claims, 7 Drawing Figures

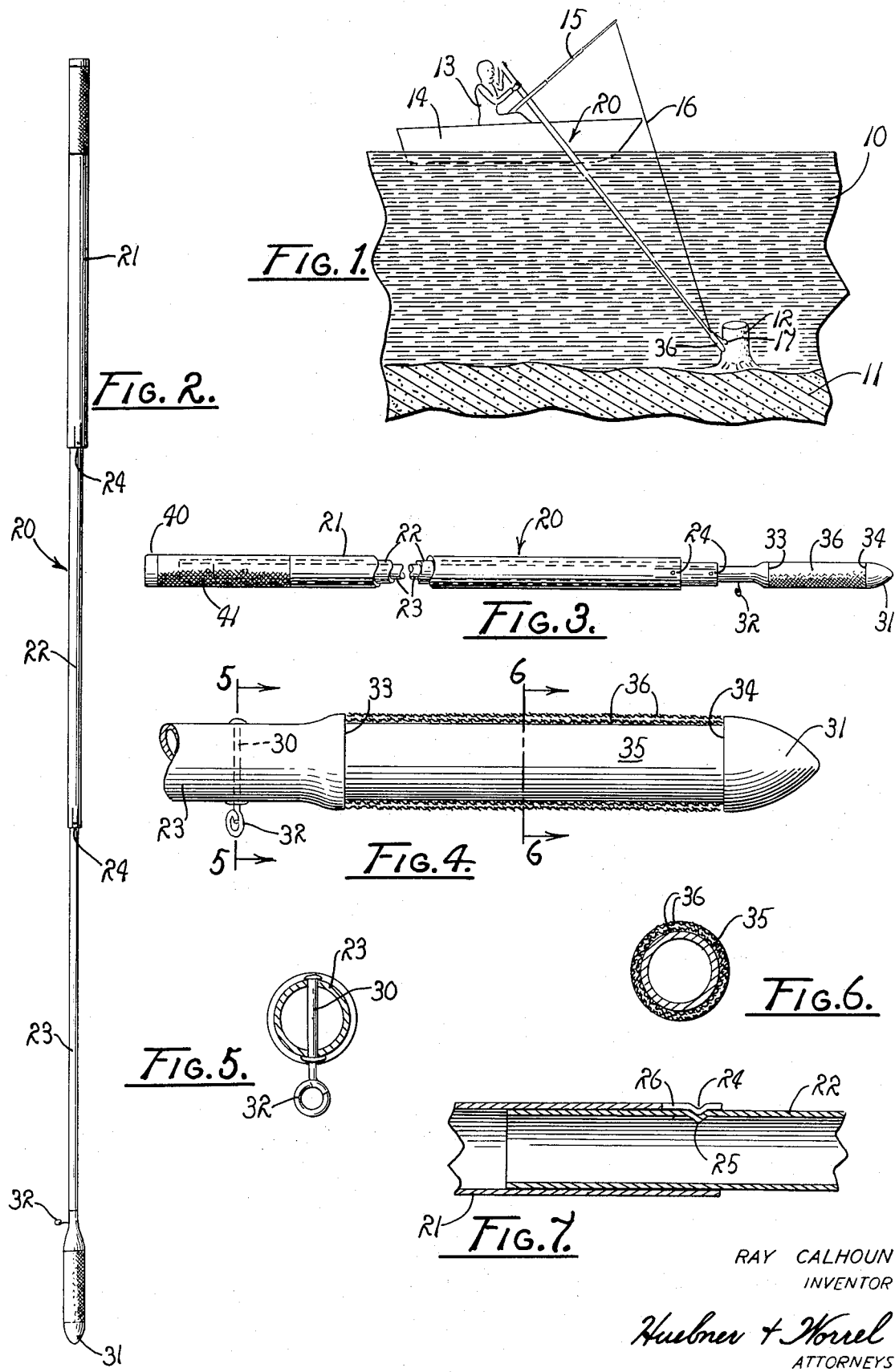

COMBINED BOAT HOOK AND LURE RETRIEVER

BACKGROUND OF THE INVENTION

The present invention relates to a fish lure retriever and more particularly to such a device for retrieving a snagged lure to which a fishline is attached which provides guide means for following the line to the lure and snagging means for attachment to the lure when it is reached.

Fishing is frequently done in waters in which aquatic plants are growing, and in which the bottom of the body of water is covered with stumps, water logged wood, brush, discarded objects and other debris. Under such conditions, the lures employed in fishing frequently become entangled with such obstructions. When a lure is entangled, the fisherman usually tensions the line connected to the lure and thus "sets" the lure more firmly in the obstruction. In many instances the lure and a substantial portion of the line, including whatever leader is utilized, are lost. This is a particularly aggravating occurrence and for many years fishermen have sought a usable lure retriever to avoid such losses.

SUMMARY OF THE INVENTION

An object of the present invention is to provide an improved fish lure retriever.

A further object is to provide a retriever for fish lures to which a fishing line is connected which utilizes the fishing line as a guide in locating the lure.

Another object is to provide a retriever for fish lures having hooks which are prone to become impaled in obstructions which makes provision for snagging such hooks so as to make possible retrieval of the lures.

Another object is to provide a fish lure retriever enabling a user thereof to exercise positive control in pushing, pulling, twisting and otherwise manipulating fish lures to effect their disengagement from obstructions in which they are snagged.

Other objects and advantages are to provide improved elements and arrangements thereof in a fish lure retriever which is dependable, economical and fully effective in accomplishing its intended functions.

BRIEF DESCRIPTION OF THE DRAWINGS

In the drawings:

FIG. 1 is a fragmentary vertical section of a body of water showing an obstruction in the bottom thereof and a fisherman in a boat utilizing an embodiment of the present invention to retrieve a fish lure snagged in the obstruction.

FIG. 2 is a somewhat enlarged side elevation of the fish lure retriever of the present invention in an extended condition.

FIG. 3 is a side elevation of the fish lure retriever in a retracted condition, portions thereof being removed for illustrative convenience.

FIG. 4 is a fragmentary enlarged view of a retrieving end of the fish lure retriever showing hook snagging means utilized therein in axial section.

FIG. 5 is a transverse section of the fish lure retriever taken on line 5—5 of FIG. 4.

FIG. 6 is a transverse section of the fish lure retriever taken at the position indicated by line 6—6 in FIG. 4.

FIG. 7 is a somewhat enlarged, fragmentary longitudinal section of a pole utilized in the device of the present invention illustrating a releasable detent employed selectively to hold segments of the pole in telescopically contracted and extended adjustment.

DESCRIPTION OF THE PREFERRED EMBODIMENT

Referring in greater detail to the drawing, in FIG. 1 a body of water 10 having a bottom 11 providing an obstruction in the form of a stump 12 constitute an illustrative environment for use of the retriever of the present invention. A fisherman 13 is shown in a boat 14 on the body of water employing a fishing pole 15 having a fishline 16 extended therefrom to a lure 17 impaled in the stump 12. The fisherman is shown employing a retriever 20 embodying the principles of the present invention.

The retriever 20 employs any suitable pole preferably, but not necessarily, consisting of a plurality of telescopic segments 21, 22, and 23. The segments are provided with releasable detents 24 operable in sockets 25 releasably to lock the segments in the extended position shown in FIG. 2 and in the contracted position shown in FIG. 3. The engagement of the clips in their respective sockets also locks the sections against relative rotational movement. The detents may take any suitable form, such as that shown in FIG. 7. In such form, the outer segment, such as that shown at 21, has a dimple swaged inwardly thereof to form an inwardly disposed protuberance constituting the detent 24. The segment is preferably slotted longitudinally at 26 on opposite sides of the detent at 26 so that the portion of the segment therebetween is resiliently flexible inwardly and outwardly of the pole 15. The inwardly adjacent segment 22 is provided with a pair of sockets 25 adapted releasably to receive the detent 24, one with the segments telescopically contracted, the other with the segments telescopically extended. Thus, the segments are releasably latched in predetermined longitudinal and rotational relation for use.

The section 23 has an extended or distal end 31. A hook engaging guide 30 is mounted transversely in the section 23 in adjacent spaced relation to the distal end of the section and provides an open eyelet 32. The guide conveniently takes the form of a spiral formation in a rod-like lateral extension from the pole 20 for ease of inserting a fishline into the eyelet and removing it therefrom. The spiral preferably extends through slightly more than 360°, as best shown in FIG. 4.

As best shown in FIGS. 3 and 4, the distal end 31 of the pole 20 is preferably somewhat enlarged to provide opposing shoulders 33 and 34 between which is a cylindrical portion 35 of a lesser diameter than the shoulders. A layer of burlap 36 or other coarse, stout fabric is wrapped about the cylindrical portion 35 to a thickness sufficient to provide an outer surface of the burlap substantially flush with the shoulders 33 and 34. Thus, in endward movement, the shoulders are substantially flush with the fabric and serve to shield it from inadvertent entanglement. The burlap is adhesively or otherwise secured in fixed position circumscribing the portion 35 and extending between the shoulders. Also, as best shown in FIGS. 3 and 4, the distal end is preferably substantially paraboloidal.

The pole 20 also has a proximal end 40 which is preferably provided with a grip 41. If desired, the proximal end 40 may also be provided with a boat hook, not shown, or other accessory for use by reversing the pole and utilizing the burlap 36 as a grip in manipulating the pole 20.

OPERATION

The operation of the fish lure retriever of the present invention is believed to be clearly apparent and is briefly summarized at this point. The retriever is conveniently carried, stowed, and utilized when the desired reaching distance is not great, with the telescopic segments 21, 22 and 23 latched in retracted positions by the detents 24 substantially as shown in FIG. 3. However, when a greater reach is required, as is the more common circumstance, the segments are extended and locked in extended positions by means of the detents 24, as shown in FIG. 1. It is also significant that the detents also lock the sections against relative rotation.

When a lure 17 connected to a fish line 16 becomes entangled or snagged in an obstruction such as the stump 12, the guide 30 is engaged with the fish line by positioning the line between the convolutions of the spiral thereof. With the fishline engaged in the eyelet 32, the line is tensioned by raising the pole 15 and the retriever slid downwardly along the line. The engagement of the line in the eyelet guides the distal end 31 of the retriever to the lure 17. Since the burlap 36 is located on the pole 20 between the guide 30 and the distal end 31 of the pole, when the guide reaches the lure, the burlap is disposed thereagainst. In such position, the fisherman 13 either rotates the pole 20 about its longitudinal axis or moves it longitudinally back and forth against the lure until the hocks thereof have been firmly snagged in the burlap 36. When this occurs, it is normally possible to draw the lure from the obstruction 12 by simply rotating the pole. In other instances, endward movement or reciprocation of the pole during such rotation facilitates withdrawing the lure from the obstruction. When this has been accomplished, the line 16 can be drawn in and/or the pole 20 drawn back to the boat 14 whereupon the lure can be unhooked from the burlap and retrieved for further use.

If it is necessary or desirable to cut the burlap 36 in order to release the lure 17 hooked therein, this can be readily done without destroying the utility of the burlap in further snagging of entrapped lures. Further, when the burlap becomes too frayed for further use because of excessive cutting, it can readily be removed from the cylindrical portion 35 and a new layer of burlap or other strong, coarse fabric positioned in its place.

The retriever of the present invention is economical to produce and has proved thoroughly effective in accomplishing its intended purposes. It can quickly and easily seek and find a snagged lure 17 by following the fishline 16 attached thereto and engaged in the guide 30. Such engagement is conveniently and easily effected and the disengagement just as easily accomplished, when desired. When the guide has insured positioning of the distal end 31 of the retriever adjacent to the lure, it is quickly and easily snagged in the burlap 36 for prompt removal and retrieval for reuse. The pole 15 can be utilized in either retracted or extended position as circumstances and convenience suggest.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A fish lure retriever comprising an elongated substantially rigid pole having a distal end, said distal end being circumscribed by a surface of revolution integral with the pole and concentric thereto, a snagging fabric wrapped in circumscribing relation about the distal end flatly in engagement therewith, and a guide mounted on the pole engageable with a fish line to guide the distal end of the pole therealong.

2. The retriever of claim 1 in which the distal end is cylindrical and the pole provides opposed annular shoulders at opposite ends thereof and the fabric is wrapped about the cylindrical portion to a depth sufficient to present an outer surface substantially flush with the shoulders.

3. The retriever of claim 2 in which the distal end terminates in a substantially paraboloidal point and shields the fabric from obstruction engagement when the pole is moved axially toward or from a fish lure.

* * * * *